(No Model.)
E. SEGER.
CENTERING DEVICE FOR REVOLVING SHAFTS.
No. 510,938. Patented Dec. 19, 1893.
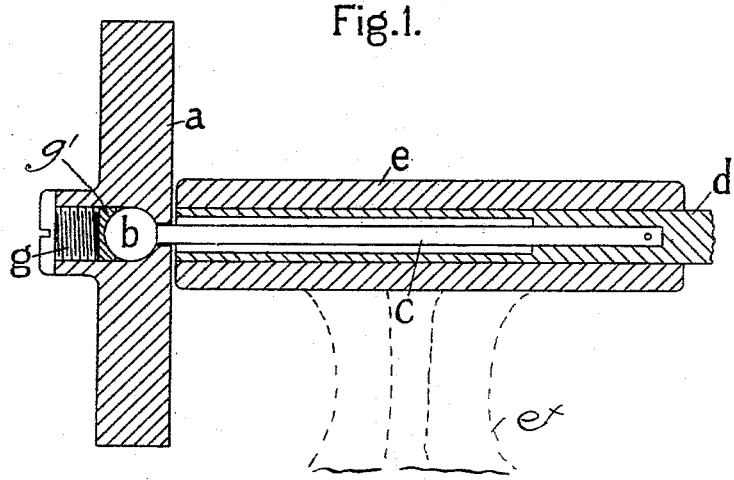
Fig.1.
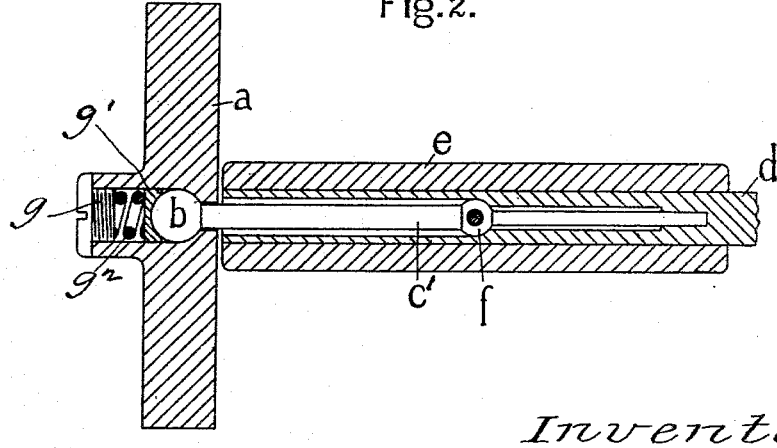
Fig.2.
Witnesses:
E. R. Bolton
E. K. Sturtevant
Inventor:
Eberhard Seger
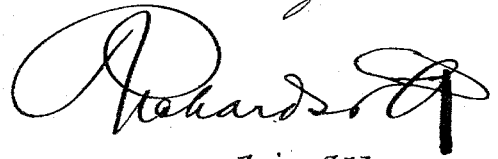
By
Richards
his Attorneys.

UNITED STATES PATENT OFFICE.

EBERHARD SEGER, OF STOCKHOLM, SWEDEN.

CENTERING DEVICE FOR REVOLVING SHAFTS.

SPECIFICATION forming part of Letters Patent No. 510,938, dated December 19, 1893.

Application filed April 20, 1893. Serial No. 471,171. (No model.)

*To all whom it may concern:*

Be it known that I, EBERHARD SEGER, engineer, a subject of the King of Sweden and Norway, and a resident of Stockholm, Sweden, have invented an Improved Centering Device for Rapidly-Revolving Shafts, of which the following is a specification.

The invention is designed to provide a centering device for rapidly revolving shafts which permits the revolving body carried thereby to adjust or center itself automatically in order to secure a quiet and easy movement.

In the drawings, Figure 1, is a sectional view of the device, and Fig. 2, a similar view of a slightly modified form.

In the drawings $a$ is the revolving body, $d$ the rotary shaft for driving the same and $e$ the bearing or socket supporting one end of said shaft. This bearing is supported by any suitable bracket or standard as shown at $e^x$ in dotted lines. The revolving body $a$ is not secured directly to the shaft $d$ but to the spring bar $c$ which is firmly fixed at its rear end to the shaft $d$, the forward end of said shaft being hollow to allow the desired lateral play of the spring bar as the revolving body accommodates itself to any inequalities in weight, and adjusts itself to the proper center. The spring bar has a ball $b$ at its end adapted to a socket in the revolving body, the body being held in place on the ball by the screw $g$ and the washer $g'$ having the semi-spherical seat to fit the ball. This not only provides a simple construction but it permits the body $a$ to adjust itself laterally and also circumferentially in relation to the spring bar and the center of the shaft in order that the body may be automatically balanced. This construction of ball joint allows one part to give or move on the other in case any undue resistance is brought to bear on either the shaft or the body $a$ and thus rupture would be prevented.

In Fig. 2, the same parts are shown somewhat slightly modified. The spring bar $c'$ in this case has a spherical bearing $f$ intermediate of its length and the lateral movement of the bar takes place from this bearing as a pivot. The rear end of the bar is reduced and is fixed to the shaft. The washer $g'$ in this case is pressed by a spring $g^2$ upon the ball $b$ and the spring is held by the screw $g$. The shaft $d$ has a large front bore and a reduced rear bore, the spherical bearing $f$ finding a bearing intermediate of these two bores.

I claim—

1. In combination, the shaft having a hollow end, the bearing $e$ therefor, the laterally yielding bar secured in the hollow end of the shaft, the ball on the end of the bar and the revolving body $a$ secured thereto, substantially as described.

2. In combination, the shaft having the hollow end, the bar $c'$ having the bearing $f$ intermediate of its length and having its rear end rigidly fixed to the shaft and the revolving body $a$ secured to the end of the bar, substantially as described.

In testimony whereof I have signed my name to this specification in the presence of two subscribing witnesses.

EBERHARD SEGER.

Witnesses:
  JOHN EDBERG,
  H. TELANDER.